United States Patent
Zhu

(10) Patent No.: US 11,160,012 B2
(45) Date of Patent: Oct. 26, 2021

(54) METHODS AND DEVICES FOR NOTIFYING SYSTEM INFORMATION MODIFICATION, AND COMPUTER-READABLE STORAGE MEDIA

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 13 days.

(21) Appl. No.: 16/664,596

(22) Filed: Oct. 25, 2019

(65) Prior Publication Data

US 2020/0059855 A1 Feb. 20, 2020

Related U.S. Application Data

(63) Continuation of application No. PCT/CN2017/082572, filed on Apr. 28, 2017.

(51) Int. Cl.
| | |
|---|---|
| *H04W 48/16* | (2009.01) |
| *H04W 48/10* | (2009.01) |
| *H04W 68/02* | (2009.01) |

(52) U.S. Cl.
CPC ........... *H04W 48/16* (2013.01); *H04W 48/10* (2013.01); *H04W 68/02* (2013.01)

(58) Field of Classification Search
CPC ..... H04W 48/08; H04W 48/16; H04W 48/10; H04W 68/02
See application file for complete search history.

(56) References Cited

U.S. PATENT DOCUMENTS

| 10,237,810 B2 * | 3/2019 | Nigam ................. H04W 88/02 |
| 10,779,224 B2 * | 9/2020 | Martinez Tarradell ..................... H04W 48/12 |

(Continued)

FOREIGN PATENT DOCUMENTS

| CN | 101217778 A | 7/2008 |
| CN | 101873694 A | 10/2010 |

(Continued)

OTHER PUBLICATIONS

International Search Report of PCT Application No. PCT/CN2017/082572 dated Jan. 25, 2018 with English translation, (20p).

(Continued)

*Primary Examiner* — Rasheed Gidado
(74) *Attorney, Agent, or Firm* — Arch & Lake LLP

(57) ABSTRACT

A method and device are provided for notifying system information modification in the field of communication technology. The method includes: generating a modification indication sequence when first system information needs to be modified, wherein the modification indication sequence is configured to indicate the first system information to be modified, and the first system information is a piece of system information of multiple pieces of system information; generating modification notification information based on the modification indication sequence; sending the modification notification information to a terminal such that the terminal determines the first system information to be modified based on the modification notification information.

20 Claims, 4 Drawing Sheets

(56) References Cited

U.S. PATENT DOCUMENTS

| | | | | |
|---|---|---|---|---|
| 2005/0153700 A1* | 7/2005 | Farnsworth | ............ | H04W 48/16 |
| | | | | 455/446 |
| 2009/0316603 A1* | 12/2009 | Amerga | ................ | H04W 48/08 |
| | | | | 370/254 |
| 2009/0318177 A1* | 12/2009 | Wang | ................ | H04W 52/0216 |
| | | | | 455/515 |
| 2019/0124625 A1* | 4/2019 | Takeda | .................. | H04W 48/16 |
| 2019/0174502 A1* | 6/2019 | Li | ........................... | H04W 4/70 |

FOREIGN PATENT DOCUMENTS

| | | | |
|---|---|---|---|
| CN | 102067676 | A | 5/2011 |
| CN | 106954259 | A | 7/2017 |
| WO | 2016186696 | A1 | 11/2016 |
| WO | 2017028024 | A1 | 2/2017 |

OTHER PUBLICATIONS

Texas Instruments Inc., "System-Information Change Notification Procedure", 3GPP TSG-RAN WG2 Meeting #61 bis R2-082491, Apr. 4, 2008 (Apr. 4, 2008), sections 2.2-2.4.2, (4p).

First Office Action corresponding to Chinese Application No. 201780000279.5, dated Jun. 28, 2020 and copy of English translation, (23p).

MediaTek Inc., Paging design for Rel-13 LC/CE UEs; 3GPP TSG RAN WG1 Meeting #82bis R1-155950, Malmo, Sweden, Oct. 9, 2015, (5p).

ZTE, Considerations on system information change notification; 3GPP TSG-RAN WG2 Meeting #93bis R2-162358, Dubrovnnik, Croatia, Apr. 15, 2016, (5p).

\* cited by examiner

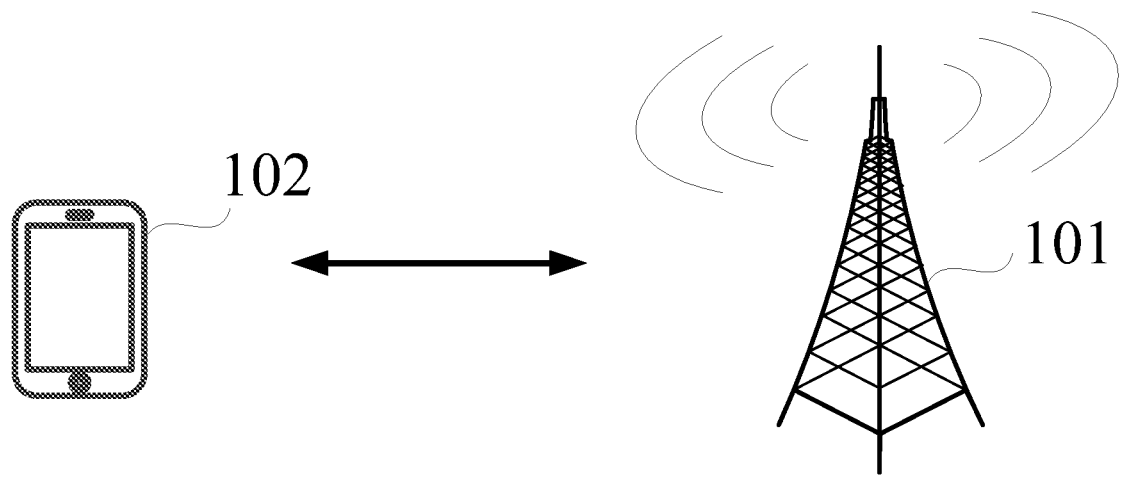

FIG. 1

```
when system information needs to be modified, generating a modification      201
indication sequence, wherein the modification indication sequence is configured
to indicate the system information to be modified, and the system information is a
piece of system information of multiple pieces of system information ▼
modification notification information is generated based on the modification  202
indication sequence ▼
the modification notification information is sent to the terminal such that the   203
terminal determines the system information needing to be modified based on the
modification notification information
```

FIG. 2

METHODS AND DEVICES FOR NOTIFYING SYSTEM INFORMATION MODIFICATION, AND COMPUTER-READABLE STORAGE MEDIA

CROSS-REFERENCE TO RELATED APPLICATION

This application is a continuation application of International Application No. PCT/CN2017/082572, filed on Apr. 28, 2017, the entire contents of which are incorporated herein by reference for all purposes.

TECHNICAL FIELD

The present disclosure relates to the field of communication technologies, and in particular, to a method and device for notifying system information notification modification, and computer-readable storage media.

BACKGROUND

When a terminal accesses a base station, the terminal needs to obtain system information broadcast by the base station, so as to accurately access the base station according to the system information for communication. The system information is divided into a master information block (MIB) and multiple system information blocks (SIB). Different information blocks carry different types of system information. The terminal may access the base station only when obtaining the correct system information. Therefore, when the system information broadcast by the base station needs to be changed/modified, the base station needs to notify the terminal system that the information needs to be changed, so that the terminal can update the system information after obtaining the notification.

SUMMARY

Various embodiments of the present disclosure provide a method and device for notifying system information modification notification methods and devices, and computer-readable storage media. The technical solutions are as follows.

According to one aspect of the present disclosure, provided is a method for notifying system information modification comprising: generating a modification indication sequence when first system information needs to be modified, wherein the modification indication sequence is configured to indicate the first system information to be modified; and the first system information is a piece of system information of multiple pieces of system information; generating modification notification information based on the modification indication sequence; sending the modification notification information to a terminal such that the terminal determines the first system information to be modified based on the modification notification information.

According to a second aspect of the present disclosure, provided is method for notifying system information modification, comprising: receiving modification notification information from a base station, wherein the modification notification information is generated by the base station based on a modification indication sequence, and the modification indication sequence is configured to indicate system information to be modified; determining the modification indication sequence based on the modification notification information; and determining, based on the modification indication sequence, the system information to be modified.

According to a third aspect of the present disclosure, provided is a device for notifying system information modification comprising: a processor; and a memory configured to store instructions executed by the processor; wherein the processor is configured to perform the steps of the method for notifying system information modification as described in the first aspect of the present disclosure.

According to a fourth aspect of the present disclosure, provided is a device for notifying system information modification comprising: a processor; and a memory configured to store instructions executed by the processor; wherein the processor is configured to perform the steps of the method for notifying system information modification as described in the second aspect of the present disclosure.

According to a fifth aspect of the present disclosure, provided is one or more storage media storing instructions which, when executed by one or more processors, cause performing the steps of the method for notifying system information modification as described in the first aspect of the present disclosure.

According to a sixth aspect of the present disclosure, provided is one or more storage media storing instructions which, when executed by one or more processors, cause performing the steps of the method for notifying system information modification as described in the second aspect of the present disclosure.

It is to be understood that both the above general description and the following detailed description are exemplary and illustrative only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a schematic diagram of an implementation environment according to an example.

FIG. 2 is a flowchart of a method for notifying system information modification according to an example.

DETAILED DESCRIPTION

Figure 3:
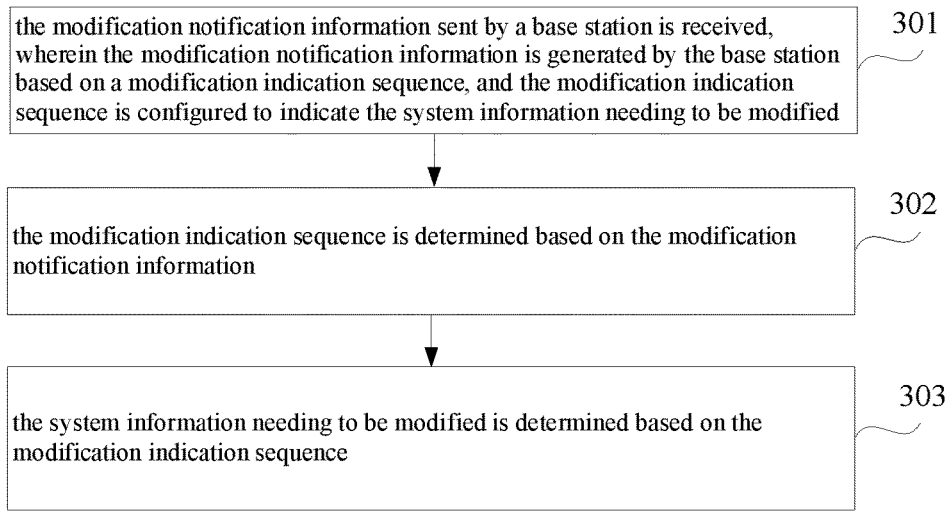
FIG. 3 is a flowchart of a method for notifying system information modification according to another example.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Currently, there are two manners in which the base station notifies the terminal that the system information needs to be changed. One manner is that the base station adds a systemInfoModification field to the paging information sent to the terminal. At this point, if receiving the paging information, the terminal can determine that the system information other than the system information SIBs 10, 11, 12, and 14 needs to be changed. The other manner is that the base station modifies the systemInfoValueTag field in the broadcast SIB1. At this point, if receiving the SIB1, the terminal can determine that the system information other than the system information MIB and SIBs 1, 10, 11, 12, and 14 needs to be changed.

Firstly, the terms related to the various embodiments of the present disclosure will be described.

System information: information that the base station periodically broadcasts over a broadcast control channel (BCCH) is configured to notify the terminal of the specific condition of a network in real time, and can be classified into an MIB and multiple SIBs according to the type.

Bitmap: a plurality of bits corresponds to multiple pieces of information respectively, and the values of the respective bits are configured to indicate the states of the information corresponding to the respective bits.

Scrambling: a processing manner for a digital signal, and a process of scrambling the original digital signal into a new digital signal with a scrambling code.

De-scrambling: the inverse process of scrambling, and the process of restoring the scrambled digital signal to the original digital signal with the scrambling code.

Secondly, scenarios related to the embodiments of the present disclosure will be described.

When the system information broadcasted by a base station needs to be modified, the base station notifies the terminal that the system information needs to be modified, so that the terminal may update the system information after obtaining the notification, and further accurately access the base station based on the updated system information. Currently, when notifying the terminal that the system information needs to be modified, the base station generally adopts two manners of adding a systemInfoModification field to the paging information sent to the terminal, or modifying the systemInfoValueTag field in the broadcasted SIB1. These two manners can only notify the terminal that the system information in some pieces of system information needs to be modified, so the terminal needs to update such pieces of system information after obtaining the notification. However, it is actually unnecessary for the terminal to update the system information which does not need to be modified in these pieces of system information. Therefore, the two manners may increase the power consumption of the terminal and cause the waste of terminal resources. To this end, embodiments of the present disclosure provide methods for notifying system information modification, so as to accurately notify the terminal of the system information to be modified, thereby reducing the power consumption of the terminal and saving the terminal resources.

Furthermore, the implementation environment related to the embodiments of the present disclosure will be described.

FIG. 1 is a schematic diagram of an implementation environment according to embodiments. Referring to FIG. 1, the implementation environment includes a base station 101 and a terminal 102, and the base station 101 and the terminal 102 may communicate via wireless connection. The base station 101 may broadcast multiple pieces of system information. When system information needing to be modified exists in the multiple pieces of system information, modification notification information is sent to the terminal 102. The terminal 102 may receive the multiple pieces of system information broadcasted by the base station 101 and the modification notification information sent by the base station 101. When the modification notification information is received, the system information needing to be modified of the multiple pieces of system information may be determined based on the modification notification information, and the system information needing to be modification is updated.

FIG. 2 is a flowchart of a method for notifying system information modification according to an example. The method is applied to a base station. As shown in FIG. 2, the method includes the following steps.

In step 201, when first system information needs to be modified, generating a modification indication sequence, wherein the modification indication sequence is configured to indicate the first system information to be modified, and the first system information is a piece of system information of multiple pieces of system information.

In step 202, modification notification information is generated based on the modification indication sequence.

In step 203, the modification notification information is sent to the terminal, and the terminal determines the system information needing to be modified based on the modification notification information.

In the embodiment of the present disclosure, when the system information needing to be modified exists in multiple pieces of system information of the base station, modified indication sequence may be generated, and the modified notification information is generated based on the modified indication sequence. Further, the modified notification information is sent to the terminal. Since the modified indication sequence is configured to indicate the system information needing to be modified, after receiving the modification notification information, the terminal can accurately determine the system information needing to be modified based on the modification notification information. At this point, the terminal only needs to update the system information needing to be modified without updating the system information which does not need to be modified subsequently, thereby effectively reducing the power consumption of the terminal and saving terminal resources.

Additionally or alternatively, generating a modification indication sequence includes the following steps. For each of the multiple pieces of system information, when the system information needs to be modified, the value of a first element is set as a specified value. The modification indication sequence comprises the first element corresponding to the system information needing to be modified. When the system information does not need to be modified, the corresponding element of the system information in the modification indication sequence is set to be a value other than the specified value.

The elements corresponding to the multiple pieces of system information in the modification indication sequence are combined into the modification indication sequence according to a specified order of the multiple pieces of system information.

Additionally or alternatively, generating a modification indication sequence includes the following step: based on a relationship between information identifiers and indication sequences, an indication sequence corresponding to an information identifier of at least one piece of system information that needs to be modified is obtained.

Additionally or alternatively, generating modification notification information based on the modification indication sequence comprises includes the following step: the content of a specified field of specified information is set as the modification indication sequence to obtain the modification notification information; or the specified information is scrambled with the modification indication sequence to obtain the modification notification information.

Additionally or alternatively, before sending the modification notification information to the terminal, the method further includes the following step: the stored corresponding relationship between the information identifiers and the indication sequences is sent to the terminal.

All of the above optional technical solutions may form the optional embodiments of the present disclosure in any combination, which are not described by the embodiments of the present disclosure one by one.

FIG. 3 is a flowchart of a method for notifying system information modification according to another example. The method is applied to a terminal. As shown in FIG. 3, the method includes the following steps.

In step 301, the modification notification information sent by a base station is received, wherein the modification notification information is generated by the base station based on a modification indication sequence, and the modification indication sequence is configured to indicate the system information needing to be modified;

In step 302, the modification indication sequence is determined based on the modification notification information.

In step 303, the system information needing to be modified is determined based on the modification indication sequence.

In the embodiment of the present disclosure, the base station can generate the modification notification information based on the modification indication sequence, and send the modification notification information to the terminal, so as to notify the terminal which system information specifically needs to be modified. After receiving the modification notification information sent by the base station, the terminal can determine the modification indication sequence base on the modification notification information. Since the modification indication sequence is configured to indicate the system information needing to be modified, the terminal can accurately determine the system information needing to be modified based on the modification indication sequence at this point. Accordingly, the terminal only needs to update the system information needing to be modified without updating the system information which does not need to be modified, thereby effectively reducing the power consumption of the terminal and saving terminal resources.

Additionally or alternatively, determining the modification indication sequence based on the modification notification information includes the following step: the content in a specified filed of the modification notification information is determined as the modification indication sequence; or the modification notification information is descrambled with the indication sequence for each of a plurality of indication sequences that are stored; and the indication sequence is determined as the modification indication sequence when the information obtained by the descrambling is specified information.

Additionally or alternatively, determining the system information needing to be modified based on the modification indication sequence includes the following steps: the system information corresponding to each element in the modification indication sequence is determined from the multiple pieces of system information based on the specified order of the multiple pieces of system information; for each element in the modification indication sequence, it is determined that the system information corresponding to an element needs to be modified when the value of the element is a specified value; it is determined that the system information corresponding to the element does not need to be modified when the element is not the specified value.

Additionally or alternatively, determining the system information needing to be modified based on the modification indication sequence includes the following steps: based on the modification indication sequence, at least one corresponding information identifier is obtained from the stored corresponding relationship between the information identifiers and the indication sequences; it is determined that the system information identified by the information identifier needs to be modified for each of the at least one information identifier.

Additionally or alternatively, before obtaining, based on the modification indication sequence, the at least one corresponding information identifier from the stored corresponding relationship between the information identifiers and the indication sequences, the method further includes the following step: the corresponding relationship between the information identifiers and the indication sequence sent by the base station is received.

All of the above optional technical solutions may form the optional embodiments of the present disclosure in any combination, which are not described by the embodiments of the present disclosure one by one.

Figure 4:
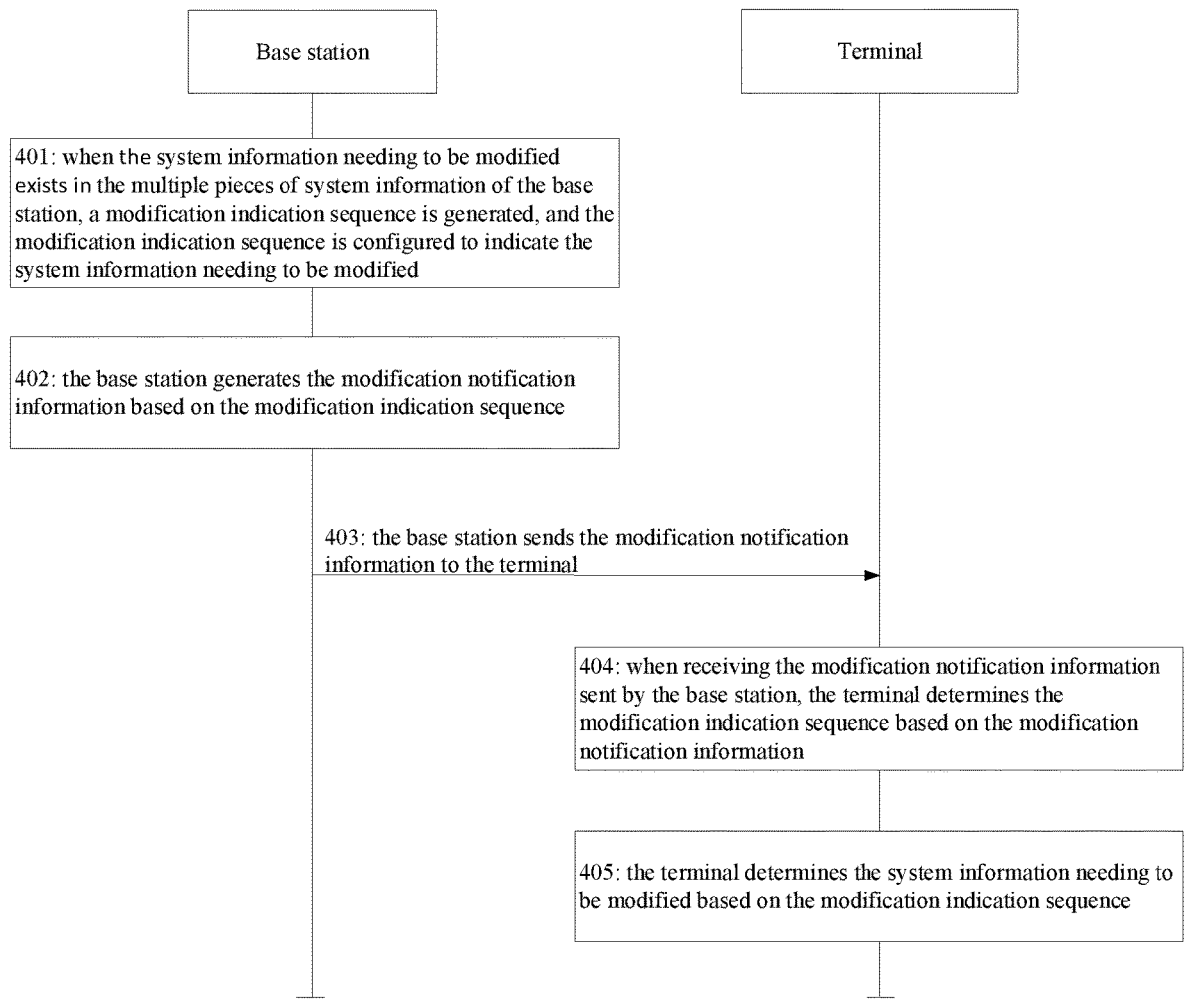
FIG. 4 is a flowchart of a method for notifying system information modification according to another example.

FIG. 4 is a flowchart of a method for notifying system information modification according to another example. As shown in FIG. 4, the method includes the following steps.

In step 401, when the system information needing to be modified exists in the multiple pieces of system information of the base station, a modification indication sequence is generated, and the modification indication sequence is configured to indicate the system information needing to be modified.

It should be noted that the multiple pieces of system information are different in type, for example, the multiple pieces of system information may include an MIB, multiple SIBs, and the like, which is not limited by the embodiment of the present disclosure.

The operation of generating the modification indication sequence may be implemented in the following two manners.

The first manner: for each of the multiple pieces of system information, the corresponding element of the system information in the modification indication sequence is set to be a specified value when the system information needs to be modified. The corresponding element of the system information in the modification indication sequence is set to be a value other than the specified value when the system information does not need to be modified. The elements corresponding to the multiple pieces of system information in the modification indication sequence are combined into the modification indication sequence according to the specified order of the multiple pieces of system information.

It should be noted that the specified value and the specified order of the multiple pieces of system information may be set in advance.

For example, the specified order of the multiple pieces of system information is system information 1 and system information 2, and the specified value is 1. It is assumed that the system information 1 needs to be modified, and the system information 2 does not need to be modified, then the corresponding element of the system information 1 in the modification indication sequence may be set to 1, and the corresponding element of the system information 2 in the modification indication sequence may be set to be the value other than 1 (for example 0). Thereafter, the corresponding elements of the multiple pieces of system information in the modification indication sequence are combined into the modification indication sequence 10 according to the specified order of the multiple pieces of system information.

It should be noted that the first manner above may be implemented with a bitmap in practical application. In such case, multiple bits in the bitmap may be in one-to-one correspondence with the multiple pieces of system information, and the values on the respective bits are configured to indicate the modification states of the system information corresponding to respective bits. For example, for each bit in the bitmap, when the system information corresponding to such bit needs to be modified, the value on the bit may be set to be a specified value (for example 1). When the system information corresponding to such bit does not need to be modified, the value on such bit may be set to be a value other than the specified value (for example 0). As described above, the bitmap generated based on the modification states of the multiple pieces of system information is the modification indication sequence.

The second manner: based on the information identifier of at least one piece of system information needing to be modified in the multiple pieces of system information, the corresponding indication sequence is obtained as the modification indication sequence from the stored corresponding relationship between the information identifier and the indication sequence.

It should be noted that the information identifier of certain piece of system information is configured to uniquely identify the system information, and the information identifier may be the name, the type, and the like of the system information.

For example, the at least one piece of system information needing to be modified in the multiple pieces of system information is system information 1 and system information 2, the information identifier of the system information 1 is information identifier 1, and the information identifier of the system information 2 is information identifier 2. Then, based on the information identifier 1 and the information identifier 2, the corresponding indication sequence 0010 is obtained as the modification indication sequence from the corresponding relationship between the information identifiers and the indication sequences shown in Table 1 below.

TABLE 1

| Information identifier | Indication sequence |
|---|---|
| Information identifier 1 | 0000 |
| Information identifier 2 | 0001 |
| Information identifier 1 + Information identifier 2 | 0010 |
| ... | ... |

It should be noted that, in the embodiment of the present disclosure, the corresponding relationship between the information identifiers and the indication sequences shown in Table 1 above is only taken as an example for illustration, and the above Table 1 does not limit the embodiment of the present disclosure.

In step 402, the base station generates the modification notification information based on the modification indication sequence.

When the manner of generating the modification indication sequence is different, the manner of generating the modification notification information generated based on the modification indication sequence is also different. Therefore, when the modification indication sequence is generated by the first manner of the above step 401, step 402 may be implemented by the first manner as follows. When the modification indication sequence is generated by the second manner of the above step 401, step 402 may be implemented by the first manner or the second manner as follows.

The first manner: the content in a specified field of specified information is set as the modification indication sequence to obtain the modification notification information.

It should be noted that the specified information may be set in advance, for example, the specified information may be paging information, paging indication information, and the like, which is not limited by the embodiment of the present disclosure. The paging indication information is configured to indicate the receiving manner of the paging information.

In addition, the specified field may be set in advance, and the content in the specified field is configured to indicate the system information needing to be modified. For example, the specified field may be a newly added information field in the specified information. The properties such as the length and location of the information field can be defined in advance.

For example, the specified information is the paging information, then one information field may be newly added to the paging information, and the newly added information field is used as the specified field. Thereafter, the content in the information field newly added to the paging information is set as the modification indication sequence, and the set paging information is the modification notification information.

The second manner: the specified information is scrambled with the modification indication sequence to obtain the modification notification information.

It should be noted that scrambling the specified information with the modification indication sequence refers to the process that the modification indication sequence is used as a scrambling code, the specified information is used as an original digital signal, and the specified information is scrambled with the modification indication sequence into a new digital signal, and the new digital signal is the modification notification information.

For example, if the modification indication sequence is 01 and the specified information is the paging information, then the paging information may be scrambled with 01, and the scrambled paging information is the modification notification information.

It should be noted that when the modification notification information is generated by the first manner of the above step 402, the content in the specified field of the modification notification information is configured to indicate the system information needing to be modified. Further, when the modification notification information is generated by the second manner of the above step 402, the scrambling code of the modification notification information is configured to indicate the system information needing to be modified.

In step 403, the base station sends the modification notification information to the terminal.

It should be noted that, if the modification indication sequence is generated by the first manner of the above step 401, in order to facilitate that the terminal can accurately determine the system information needing to be modified based on the modification notification information when receiving the modification notification information subsequently, before the base station sends the modification notification information to the terminal, the specified value and the specified order of the multiple pieces of system information used in the first manner of the above step 401 may be sent to the terminal, so that the terminal can accurately determine the system information needing to be modified based on the specified value, the specified order of the multiple pieces of system information and the modification notification information.

When the base station sends the specified value and the specified order of the multiple pieces of system information to the terminal, the specified value and the specified order of the multiple pieces of system information may be sent to the terminal by first preset information. At this point, the first preset information carries the specified value and the specified order of the multiple pieces of system information. Of course, the base station may also send the specified value and the specified order of the multiple pieces of system information to the terminal by other manners, which is not limited by the embodiment of the present disclosure.

It should be noted that the first preset information may be set in advance, for example, the first preset information may be system information, radio resource control (RRC) signaling, media access control (MAC) control element (CE) signaling, a physical layer (PHY) signaling, etc., which is not limited in the present embodiment of the present disclosure.

In addition, if the modification indication sequence is generated by the second manner of the above step 401, then similarly, in order to facilitate that the terminal can accurately determine the system information needing to be modified based on the modification notification information when receiving the modification notification information subsequently, before the base station sends the modification notification information to the terminal, the corresponding relationship between the information identifier and the indication sequence used in the second manner of the above step 401 may be sent to the terminal, so that the terminal can accurately determine the system information needing to be modified based on the corresponding relationship between the information identifier and the indication sequence and the modification notification information.

When the base station sends the corresponding relationship between the information identifier and the indication sequence to the terminal, the corresponding relationship between the information identifier and the indication sequence may be sent to the terminal by second preset information. The second preset information carries the corresponding relationship between the information identifier and the indication sequence. Certainly, the base station may also send the corresponding relationship between the information identifier and the indication sequence to the terminal in other manners, which is not limited by the embodiment of the disclosure.

It should be noted that the second preset information may be set in advance, for example, the second preset information may be system information, RRC signaling, MAC CE signaling, PHY signaling, etc., which is not limited by the present embodiment of the present disclosure.

In step 404, when receiving the modification notification information sent by the base station, the terminal determines the modification indication sequence based on the modification notification information.

When the modification notification information is generated by the first manner of the above step 402, the operation of determining the modification indication sequence based on the modification notification information may be implemented by the first manner as follows. When the modification notification information is generated by the second manner of the above step 402, the operation of determining the modification indication sequence based on the modification notification information may be implemented by the second manner as follows.

The first manner: the content in the specified field of the modification notification information is determined as the modification indication sequence.

In the first manner of the above step 402, after the content in the specified field of the specified information is set as the modification indication sequence, the modification notification information is obtained. Therefore, the content in the specified field of the modification notification information can be determined as the modification indication sequence at this point.

The second manner: the modification notification information is descrambled with the indication sequence for each of the stored plurality of indication sequences. When the descrambled information is the specified information, the indication sequence is determined as the modification indication sequence.

In the second manner of the above step 402, the modification notification information is obtained by scrambling the specified information with the modification indication sequence. Therefore, the modification notification information can be descrambled by the stored plurality of indication sequences in sequence. For a certain indication sequence, when the information obtained by descrambling the modification notification information with the indication sequence is the specified information, it is indicated that the modification notification information is obtained by scrambling the specified information with the indication sequence, and such indication sequence can be determined as the modification indication sequence.

It should be noted that the plurality of indication sequences may be set in advance, for example, the plurality of indication sequences may be the indication sequences in the corresponding relationship between the information identifier and the indication sequence stored by the terminal, and the like.

In step 405, the terminal determines the system information needing to be modified based on the modification indication sequence.

It should be noted that after determining the system information needing to be modified based on the modification indication sequence, the terminal may directly update the system information needing to be modified subsequently, so as to accurately access the base station based on the updated system information for communication. At this point, the terminal only updates the system information needing to be modified without updating the system information which does not need to be modified, thereby effectively reducing the power consumption of the terminal and saving terminal resources.

When the manner of generating the modification indication sequence is different, the manner of determining the system information needing to be modified based on the modification indication sequence is also different. Therefore, when the modification indication sequence is generated by the first manner of the above step 401, step 405 may be implemented by the first manner as follows. When the modification indication sequence is generated by the second manner in the above step 401, step 405 may be implemented by the second manner as follows.

The first manner: based on the specified order of the multiple pieces of system information, the system information corresponding to each element in the modification indication sequence is determined from the multiple pieces of system information. For each element in the modification indication sequence, when the element is a specified value, it is determined that the system information corresponding to the element needs to be modified. When the element is not the specified value, it is determined that the system information corresponding to the element does not need to be modified.

When the system information corresponding to each element in the modification indication sequence is determined from the multiple pieces of system information based on the specified order of the multiple pieces of system information, the multiple pieces of system information may be determined one by one as the system information corresponding to a plurality of elements in the modification indication sequence according to the specified order of the multiple pieces of system information.

For example, the specified order of the multiple pieces of system information is system information 1 and system information 2, and the modification indication sequence is 10. Then, based on the specified order of the multiple pieces of system information, it may be determined that the system information corresponding to the element 1 in the modification indication sequence is the system information 1, and the system information corresponding to the element 0 in the modification indication sequence is the system information 2. It is assumed that the specified value is 1, it can be determined that the system information 1 corresponding to the element 1 needs to be modified, and that the system information 2 corresponding to the element 0 does not need to be modified.

It should be noted that the specified value and the specified order of the multiple pieces of system information may be determined and obtained by a predefined method, for example a communication protocol. Of course, the specified value and the specified order of the multiple pieces of system information may also be obtained by the terminal from the base station before step 405, which is not limited by the embodiment of the disclosure.

The second manner: based on the modification indication sequence, the at least one corresponding information identifier is obtained from the stored corresponding relationship between the information identifier and the indication sequence. For each information identifier in the at least one information identifier, it is determined that the system information identified by the information identifier needs to be modified.

For example, if the modification indication sequence is 0010, then the at least one corresponding information identifier obtained from the corresponding relationship between the information identifiers and the specified orders shown in Table 1 above based on the modification indication sequence 0010 is information identifier 1 and information identifier 2. It is assumed that the information identifier 1 is configured to identify the system information 1, and the information identifier 2 is configured to identify the system information 2, then it can be determined that both the system information 1 and the system information 2 need to be modified.

It should be noted that the corresponding relationship between the information identifiers and the indication sequences may be determined and obtained by a predefined method, for example a communication protocol. Of course, the corresponding relationship between the information identifiers and the indication sequences may also be obtained by the terminal from the base station before step 405, which is not limited by the embodiment of the disclosure.

In the embodiment of the present disclosure, when the system information needing to be modified exists in multiple pieces of system information of the base station, the modification indication sequence can be generated, and the modification notification information is generated based on the modification indication sequence. Further, the modification notification information is sent to the terminal, so as to notify the terminal which system information needs to be modified specifically. After receiving the modification notification information sent by the base station, the terminal can determine the modification indication sequence base on the modification notification information. Since the modification indication sequence is configured to indicate the system information needing to be modified, the terminal can accurately determine the system information needing to be modified based on the modification indication sequence at this point. At this point, the terminal only needs to update the system information needing to be modified without updating the system information which does not need to be modified, thereby effectively reducing the power consumption of the terminal and saving terminal resources.

Figure 5:
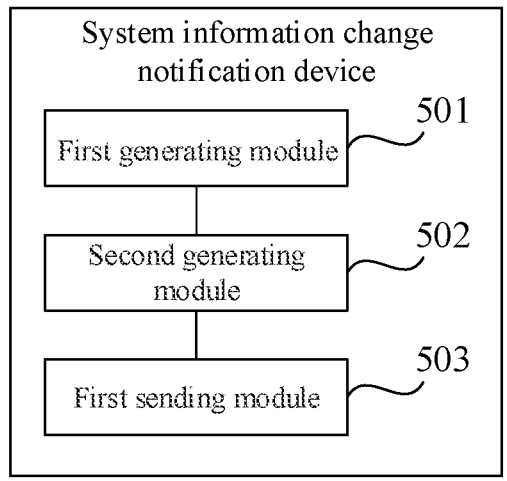
FIG. 5 is a block diagram of a device for notifying system information modification according to an example.

FIG. 5 is a block diagram of a device for notifying system information modification according to an example. Referring to FIG. 5, the device includes a first generating module 501, a second generating module 502, and a first sending module 503.

The first generating module 501 is configured to generate a modification indication sequence when the system information needing to be modified exists in multiple pieces of system information, the modification indication sequence being configured to indicate the system information needing to be modified.

The second generating module 502 is configured to generate modification notification information based on the modification indication sequence.

The first sending module 503 is configured to send the modification notification information to a terminal, and the terminal determines the system information needing to be modified based on the modification notification information.

Additionally or alternatively, the first generating module 501 includes the following sub-modules.

A first setting sub-module is configured to, for each of the multiple pieces of system information, set the corresponding element of the system information in the modification indication sequence to be a specified value when the system information needs to be modified.

A second setting sub-module is configured to set the corresponding element of the system information in the modification indication sequence to be a value other than the specified value when the system information does not need to be modified.

A combining sub-module is configured to combine the elements corresponding to the multiple pieces of system information in the modification indication sequence into the modification indication sequence according to the specified order of the multiple pieces of system information.

Additionally or alternatively, the first generating module 501 includes the following sub-module.

An acquiring sub-module is configured to, based on the information identifier of at least one piece of system information needing to be modified in the multiple pieces of system information, obtain the corresponding indication sequence as the modification indication sequence from the stored corresponding relationship between information identifiers and indication sequences.

Additionally or alternatively, the second generating module 502 includes the following sub-modules.

A third setting sub-module is configured to set the content of a specified field of specified information as the modification indication sequence to obtain the modification notification information; or, A scrambling sub-module is configured to scramble the specified information with the modification indication sequence to obtain the modification notification information.

Additionally or alternatively, the device further includes the following module.

A second sending module is configured to send the stored corresponding relationship between the information identifier and the indication sequence to the terminal.

In the embodiment of the present disclosure, when the system information needing to be modified exists in multiple pieces of system information of the base station, the modification indication sequence may be generated, and the modification notification information is generated based on the modification indication sequence. Further, the modification notification information is sent to the terminal. Since the modification indication sequence is configured to indicate the system information needing to be modified, after receiving the modification notification information, the terminal can accurately determine the system information needing to be modified based on the modification notification information. At this point, the terminal only needs to update the system information needing to be modified without updating the system information which does not need to be modified subsequently, thereby effectively reducing the power consumption of the terminal and saving terminal resources.

With regard to the device in the above embodiment, the specific manner in which the respective modules perform the operation has been described in detail in the embodiment related to the method, and will not be described in detail herein.

Figure 6:
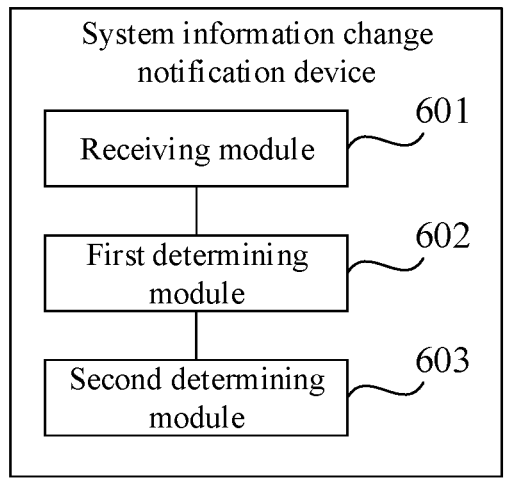
FIG. 6 is a block diagram of a device for notifying system information modification according to another example.

FIG. 6 is a block diagram of a device for notifying system information modification according to another example. Referring to FIG. 6, the device includes a receiving module 601, a first determining module 602, and a second determining module 603.

The receiving module 601 is configured to receive the modification notification information sent by a base station, wherein the modification notification information is generated by the base station based on a modification indication sequence, and the modification indication sequence is configured to indicate the system information needing to be modified.

The first determining module 602 is configured to determine the modification indication sequence based on the modification notification information.

The second determining module 603 is configured to determine the system information needing to be modified based on the modification indication sequence.

Additionally or alternatively, the first determining module 602 includes the following sub-module.

A first determining sub-module is configured to determine the content in a specified field of the modification notification information as the modification indication sequence; or A second determining sub-module is configured to descramble the modification notification information with the indication sequence for each of the stored plurality of indication sequences; and determine the indication sequence as the modification indication sequence when the descrambled information is specified information.

Additionally or alternatively, the second determining module 603 includes the following sub-modules.

A third determining sub-module is configured to determine the system information corresponding to each element in the modification indication sequence from the multiple pieces of system information based on the specified order of the multiple pieces of system information.

A fourth determining sub-module is configured to, for each element in the modification indication sequence, determine that the system information corresponding to the element needs to be modified when the element is a specified value.

A fifth determining sub-module is configured to determine that the system information corresponding to the element does not need to be modified when the element is not the specified value.

Optionally, the second determining module 603 includes the following sub-modules.

An acquiring sub-module is configured to obtain, based on the modification indication sequence, at least one corresponding information identifier from the stored corresponding relationship between the information identifier and the indication sequence.

A sixth determining sub-module is configured to determine that the system information identified by the information identifier needs to be modified for each of the at least one information identifier.

Additionally or alternatively, the second determining module 603 further includes the following sub-module.

A receiving sub-module is configured to receive the corresponding relationship between the information identifiers and the indication sequences sent by the base station.

In the embodiment of the present disclosure, the base station can generate the modification notification information based on the modification indication sequence, and send the modification notification information to the terminal, so as to notify the terminal which system information needs to be modified specifically. After receiving the modification notification information sent by the base station, the base station can determine the modification indication sequence base on the modification notification information. Since the modification indication sequence is configured to indicate the system information needing to be modified, the terminal can accurately determine the system information needing to be modified based on the modification indication sequence at this point. Accordingly, the terminal only needs to update the system information needing to be modified without updating the system information which does not need to be modified, thereby effectively reducing the power consumption of the terminal and saving terminal resources.

With regard to the device in the above embodiment, the specific manner in which the respective modules perform the operations has been described in detail in the embodiment related to the method, and will not be explained in detail herein.

Figure 7:
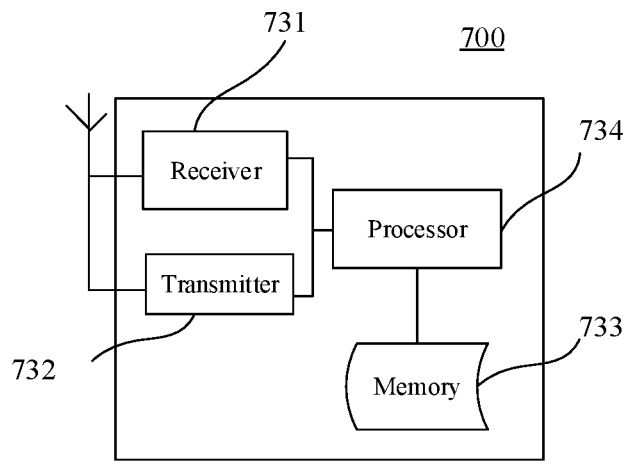
FIG. 7 is a block diagram of a device for notifying system information modification according to another example.

FIG. 7 is a block diagram of a device 700 for notifying system information modification according to an example. For example, the device 700 may be provided as a base station. Referring to FIG. 7, the base station 700 includes a receiver 731, a transmitter 732, a memory 733, and a processor 734 connected to the receiver 731, the transmitter 732, and the memory 733 respectively, wherein the processor 734 is configured to perform the system information modification notification method provided by the above embodiment of FIG. 2.

In an example, there is also provided a non-transitory computer-readable storage medium including instructions, for example, the memory 733 including instructions. The above instructions are executable by the processor 734 of the base station 700 to implement the system information modification notification method provided by the embodiment of FIG. 2 above. For example, the non-transitory computer-readable storage medium may be an ROM, a random-access memory (RAM), a CD-ROM, a magnetic tape, a floppy disk, an optical data storage device, etc.

A non-transitory computer-readable storage medium enables the base station to perform the system information modification notification method provided by the embodiment of FIG. 2 above when the instructions in the storage medium are performed by the processor of the base station.

Figure 8:
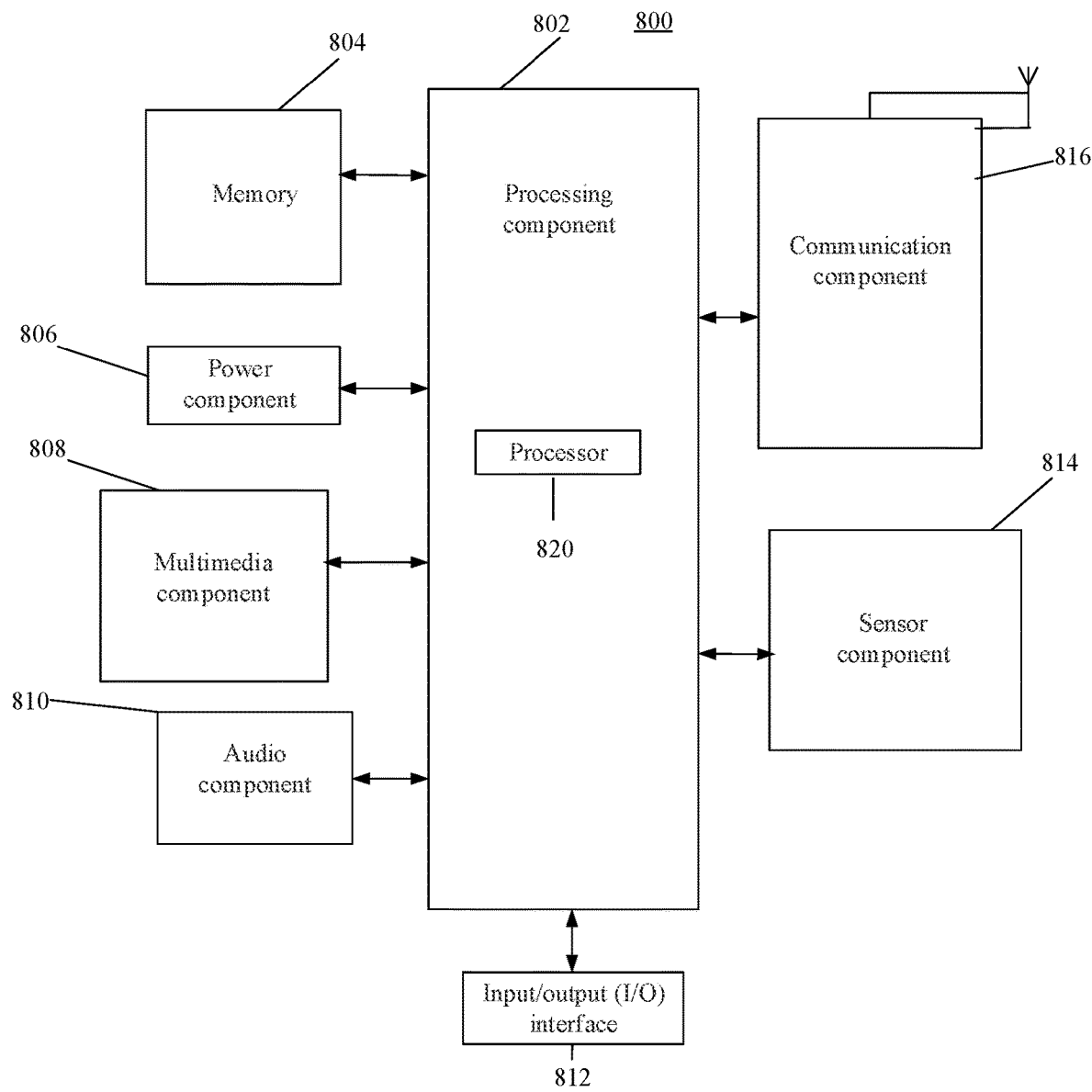
FIG. 8 is a block diagram of a device for notifying system information modification according to another example.

FIG. 8 is a block diagram of a device 800 for notifying system information modification in accordance with an example. For example the device 800 may be a mobile phone, a computer, a digital broadcast terminal, a messaging device, a gaming console, a tablet device, a medical device, a fitness equipment, a personal digital assistant, and the like Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls the overall operations of the device 800, such as the operations associated with display, telephone calls, data communications, camera operations, and recording operations. The processing component 802 may include one or more processors 820 to execute indications to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include indications for any applications or methods operated on the device 800, contact data, phonebook data, messages, pictures, videos, etc. The memory 804 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 808 includes a front camera and/or a rear camera. The front camera and the rear camera may receive external multimedia data while the device 800 is in an operation manner, such as a photographing manner or a video manner. Each of the front camera and the rear camera may be a fixed optical lens system or have focus and optical zoom capability.

The audio component 810 is configured to output and/or input audio signals. For example, the audio component 810 includes a microphone (MIC) configured to receive external audio signals when the device 800 is in an operation manner, such as a call manner, a recording manner, and a voice recognition manner. The received audio signal may be further stored in the memory 804 or sent via the communication component 816. In some embodiments, the audio component 810 further includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a start button, and a lock button.

The sensor component 814 includes one or more sensors to provide status assessments of various aspects of the device 800. For instance, the sensor component 814 may detect an on/off status of the device 800, relative positioning of components, e.g., the display device and the mini keyboard of the device 800, and the sensor component 814 may also detect a position modification of the device 800 or a component of the device 800, presence or absence of user contact with the device 800, orientation or acceleration/deceleration of the device 800, and temperature modification of the device 800. The sensor component 814 may include a proximity sensor configured to detect the presence of nearby objects without any physical contact. The sensor component 814 may also include a light sensor, such as a CMOS or CCD image sensor, used for imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi 2G, or 3G, or a combination thereof. In an example, the communication component 816 receives broadcast signals or broadcast associated information from an external broadcast management system via a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, a non-transitory computer-readable storage medium including indications is also provided, such as the memory 804 including indications, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

The technical solution provided by the various embodiments of the present disclosure may lead the following beneficial effects: when the system information needing to be modified exists in multiple pieces of system information of the base station, the modification indication sequence may be generated, and the modification notification information is generated based on the modification indication sequence. Further, the modification notification information is sent to the terminal. Since the modification indication sequence is configured to indicate the system information needing to be modified, after receiving the modification notification information, the terminal can accurately determine the system information needing to be modified based on the modification notification information. At this point, the terminal only needs to update the system information needing to be modified without updating the system information which does not need to be modified subsequently, thereby effectively reducing the power consumption of the terminal and saving terminal resources.

In some embodiments, wherein generating the modification indication sequence comprises: when the first system information needs to be modified, setting the value of a first element as a specified value, wherein the modification indication sequence comprises the first element corresponding to the first system information; when the first system information does not need to be modified, setting the value of the first element as a value other than the specified value; and generating the modification indication sequence by combining elements of the modification indication sequence in a specified order, wherein the elements are corresponding to the multiple pieces of system information.

In some embodiments, wherein generating the modification indication sequence comprises: obtaining, based on a relationship between information identifiers and indication sequences, an indication sequence corresponding to an information identifier of at least one piece of system information that needs to be modified.

In some embodiments, wherein generating modification notification information based on the modification indication sequence comprises: obtaining the modification notification information by setting the content of a specified field of specified information as the modification indication sequence; or obtaining the modification notification information by scrambling the specified information with the modification indication sequence.

In some embodiments, prior to sending the modification notification information to the terminal, further comprising: sending the relationship between the information identifiers and the indication sequences to the terminal.

In some embodiments, wherein determining the modification indication sequence based on the modification notification information comprises: determining the content of a specified domain of the modification notification information as the modification indication sequence; or descrambling the modification notification information with an indication sequence of a plurality of indication sequences; and determining, when the information obtained by the descrambling is specified information, that the indication sequence is the modification indication sequence.

In some embodiments, wherein determining, based on the modification indication sequence, the system information to be modified comprises: determining system information, from a multiple pieces of system information, corresponding to each element in the modification indication sequence based on a specified order of the multiple pieces of system information; determining, when the value of an element in the modification indication sequence is a specified value, that system information corresponding to the element needs to be modified; and determining, when the value of the element is not the specified value, that the system information does not need to be modified.

In some embodiments, wherein determining, based on the modification indication sequence, the system information to be modified comprises: obtaining, based on a relationship between information identifiers and indication sequences, at least one information identifier corresponding to the modification indication sequence; and determining that the system information identified by each information identifier of the at least one information identifier needs to be modified.

In some embodiments, prior to obtaining, based on a relationship between information identifiers and indication sequences, at least one information identifier corresponding to the modification indication sequence, further comprising: receiving the relationship between the information identifiers and the indication sequences from the base station.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for notifying system information modification, comprising:
    generating a modification indication sequence when first system information needs to be modified, wherein the modification indication sequence is configured to indicate the first system information to be modified, and the first system information is a piece of system information of multiple pieces of system information;
generating modification notification information based on the modification indication sequence; and
sending the modification notification information to a terminal such that the terminal determines the first system information to be modified based on the modification notification information,
wherein generating modification notification information based on the modification indication sequence comprises one of:
obtaining the modification notification information by setting the content of a specified field of specified information as the modification indication sequence, wherein the specified field is a newly added information field in the specified information; or
obtaining the modification notification information by using the modification indication sequence as a scrambling code, using the specified information as an original digital signal, scrambling the specified information with the modification indication sequence to generate a new digital signal, and using the new digital signal as the modification notification information.

2. The method according to claim 1, wherein generating modification indication sequence comprises:
when the first system information needs to be modified, setting the value of a first element as a specified value, wherein the modification indication sequence comprises the first element corresponding to the first system information;
when the first system information does not need to be modified, setting the value of the first element as a value other than the specified value; and
generating the modification indication sequence by combining elements of the modification indication sequence in a specified order, wherein the elements are corresponding to the multiple pieces of system information.

3. The method according to claim 1, wherein generating modification indication sequence comprises:
obtaining, based on a relationship between information identifiers and indication sequences, an indication sequence corresponding to an information identifier of at least one piece of system information that needs to be modified.

4. The method according to claim 3, prior to sending the modification notification information to the terminal, further comprising:
sending the relationship between the information identifiers and the indication sequences to the terminal.

5. The method according to claim 3, wherein the relationship between information identifiers and indication sequences includes the relationship between a plurality of information identifiers and an indication sequence, and each indication sequence is a 4-bit sequence.

6. A method for notifying system information modification, comprising:
receiving modification notification information from a base station, wherein the modification notification information is generated by the base station by setting the content of a specified field of specified information as a modification indication sequence, wherein the specified field is a newly added information field in the specified information; or using the modification indication sequence as a scrambling code, the specified information as an original digital signal, scrambling the specified information with the modification indication sequence into a new digital signal, and using the new digital signal as the modification notification information, and the modification indication sequence is configured to indicate system information to be modified;
determining the modification indication sequence based on the modification notification information; and
determining, based on the modification indication sequence, the system information to be modified.

7. The method according to claim 6, wherein determining the modification indication sequence based on the modification notification information comprises:
determining the content of a specified domain of the modification notification information as the modification indication sequence; or
descrambling the modification notification information with an indication sequence of a plurality of indication sequences, and determining, when the information obtained by the descrambling is specified information, that the indication sequence is the modification indication sequence.

8. The method according to claim 6, wherein determining, based on the modification indication sequence, the system information to be modified comprises:
determining system information, from a multiple pieces of system information, corresponding to each element in the modification indication sequence based on a specified order of the multiple pieces of system information;
determining, when the value of an element in the modification indication sequence is a specified value, that system information corresponding to the element needs to be modified; and
determining, when the value of the element is not the specified value, that the system information does not need to be modified.

9. The method according to claim 6, wherein determining, based on the modification indication sequence, the system information to be modified comprises:
obtaining, based on a relationship between information identifiers and indication sequences, at least one information identifier corresponding to the modification indication sequence; and
determining that the system information identified by each information identifier of the at least one information identifier needs to be modified.

10. The method according to claim 9, prior to obtaining, based on a relationship between information identifiers and indication sequences, at least one information identifier corresponding to the modification indication sequence, further comprising:
receiving the relationship between the information identifiers and the indication sequences from the base station.

11. The method according to claim 9, wherein the relationship between information identifiers and indication sequences includes the relationship between a plurality of information identifiers and an indication sequence, and each indication sequence is a 4-bit sequence.

12. A device for notifying system information modification, comprising:
a processor; and
a memory configured to store instructions executed by the processor;
wherein the processor is configured to perform the instructions to:

generate a modification indication sequence when first system information needs to be modified, wherein the modification indication sequence is configured to indicate the first system information to be modified, and the first system information is a piece of system information of multiple pieces of system information;

generate modification notification information based on the modification indication sequence; and send the modification notification information to a terminal such that the terminal determines the first system information to be modified based on the modification notification information, wherein generating modification notification information based on the modification indication sequence comprises one of:

obtaining the modification notification information by setting the content of a specified field of specified information as the modification indication sequence, wherein the specified field is a newly added information field in the specified information; or obtaining the modification notification information by using the modification indication sequence as a scrambling code, the specified information as an original digital signal, scrambling the specified information with the modification indication sequence into a new digital signal, and using the new digital signal as the modification notification information.

13. The device according to claim 12, wherein the processor is further configured to perform the instructions to:

when the first system information needs to be modified, set the value of a first element as a specified value, wherein the modification indication sequence comprises the first element corresponding to the first system information;

when the first system information does not need to be modified, set the value of the first element as a value other than the specified value; and generate the modification indication sequence by combining elements of the modification indication sequence in a specified order, wherein the elements are corresponding to the multiple pieces of system information.

14. The device according to claim 12, wherein the processor is further configured to perform the instructions to:

obtain, based on a relationship between information identifiers and indication sequences, an indication sequence corresponding to an information identifier of at least one piece of system information that needs to be modified.

15. The device according to claim 14, wherein the processor is further configured to perform the instructions to:

send, prior to sending the modification notification information to the terminal, the relationship between the information identifiers and the indication sequences to the terminal.

16. A device for notifying system information modification, comprising:

a processor; and a memory configured to store instructions executed by the processor;

wherein the processor is configured to perform the instructions to:

receive modification notification information from a base station, wherein the modification notification information is generated by the base station by setting the content of a specified field of specified information as a modification indication sequence, wherein the specified field is a newly added information field in the specified information; or using the modification indication sequence as a scrambling code, the specified information as an original digital signal, scrambling the specified information with the modification indication sequence into a new digital signal, and using the new digital signal as the modification notification information, and the modification indication sequence is configured to indicate system information to be modified;

determine the modification indication sequence based on the modification notification information; and determine, based on the modification indication sequence, the system information to be modified.

17. The device according to claim 16, the processor is further configured to perform the instructions to:

determine the content of a specified domain of the modification notification information as the modification indication sequence; or descramble the modification notification information with an indication sequence of a plurality of indication sequences, and determine, when the information obtained by the descrambling is specified information, that the indication sequence is the modification indication sequence.

18. The device according to claim 16, the processor is further configured to perform the instructions to:

determine system information, from a multiple pieces of system information, corresponding to each element in the modification indication sequence based on a specified order of the multiple pieces of system information;

determine, when the value of an element in the modification indication sequence is a specified value, that system information corresponding to the element needs to be modified; and determine, when the value of the element is not the specified value, that the system information does not need to be modified.

19. The device according to claim 16, the processor is further configured to perform the instructions to:

obtain, based on a relationship between information identifiers and indication sequences, at least one information identifier corresponding to the modification indication sequence; and determine that the system information identified by each information identifier of the at least one information identifier needs to be modified.

20. The device according to claim 19, the processor is further configured to perform the instructions to:

receive, prior to obtaining, based on a relationship between information identifiers and indication sequences, at least one information identifier corresponding to the modification indication sequence, the relationship between the information identifiers and the indication sequences from the base station.

* * * * *